(12) United States Patent
Eguchi

(10) Patent No.: US 10,073,436 B2
(45) Date of Patent: Sep. 11, 2018

(54) FULLY-CLOSED LOOP POSITION CONTROLLER

(71) Applicant: OKUMA Corporation, Niwa-gun, Aichi (JP)

(72) Inventor: Satoshi Eguchi, Aichi (JP)

(73) Assignee: OKUMA CORPORATION, Niwa-Gun, Aichi (JP)

( * ) Notice: Subject to any disclaimer, the term of this patent is extended or adjusted under 35 U.S.C. 154(b) by 0 days.

(21) Appl. No.: 15/363,476

(22) Filed: Nov. 29, 2016

(65) Prior Publication Data

US 2017/0153622 A1 Jun. 1, 2017

(30) Foreign Application Priority Data

Nov. 30, 2015 (JP) .................................. 2015-232850

(51) Int. Cl.
*G05B 11/01* (2006.01)
*G05B 19/402* (2006.01)
*G05B 19/416* (2006.01)

(52) U.S. Cl.
CPC ......... *G05B 19/402* (2013.01); *G05B 19/416* (2013.01); *G05B 2219/34013* (2013.01); *G05B 2219/40422* (2013.01)

(58) Field of Classification Search
CPC ........... G05B 2219/39222; G05B 2219/39336; G05B 2219/39355; G05B 2219/41368; G05B 2219/41373
See application file for complete search history.

(56) References Cited

U.S. PATENT DOCUMENTS

| 5,223,778 | A | * | 6/1993 | Svarovsky | G05B 11/42 318/609 |
| 5,304,905 | A | * | 4/1994 | Iwasaki | G05B 19/19 318/561 |
| 2003/0040817 | A1 | * | 2/2003 | Krah | H02P 29/0016 700/55 |
| 2004/0085035 | A1 | * | 5/2004 | Tazawa | H02P 7/2805 318/432 |

FOREIGN PATENT DOCUMENTS

JP 2013148422 A 8/2013

* cited by examiner

*Primary Examiner* — Bickey Dhakal
(74) *Attorney, Agent, or Firm* — Cantor Colburn LLP

(57) ABSTRACT

A fully-closed loop position controller with a velocity control system based on a velocity feedback of mixed velocities of a motor velocity and a load velocity. The fully-closed loop position controller identifies a ratio of load moment of inertia in real time to select an optimum mix gain in accordance with a changing ratio of load moment of inertia such that a position loop gain and a speed loop gain can be varied accordingly. The fully-closed loop position controller controls the load position based on the mix gain, the position loop gain, and the velocity loop gain.

2 Claims, 4 Drawing Sheets

FULLY-CLOSED LOOP POSITION CONTROLLER

CROSS REFERENCE TO RELATED APPLICATION

The entire disclosure of Japanese Patent Application No. 2015-232850 filed on Nov. 30, 2015 including specification, claims, drawings, and abstract is incorporated herein by reference in its entirety.

TECHNICAL FIELD

This disclosure relates to a servo controller which performs shaft control of an arm of a machine tool or robot, and more particularly to a fully-closed loop position controller whose object is to control the position of a load in accordance with a position command value by directly sensing the position of an end of the load.

BACKGROUND

In general, a fully-closed loop position controller used for shaft control of a numerically-controlled machine controls a load position θL of a controlled objective (hereinafter referred to as "target plant") in accordance with a position command value XC supplied from a higher-level device by controlling a control input τm to a drive motor. Thus, a fully-closed loop position controller requires a high level of system stability (including a vibration suppression performance), an accurate command following performance, and a high level of load disturbance suppression performance.

FIG. 5 is a block diagram showing an example of a conventional fully-closed loop position controller. The target plant 200 is represented in terms of a rotational motor shaft. As the target plant 200 has a transfer pole ωP and a transfer zero ωZ as transfer characteristics, the target plant 200 is described in a configuration in which a motor moment of inertia Im and a load moment of inertia IL are connected via a spring system having a rigidity K. "s" represents an operator of a Laplace transform. An equation of motion of the target plant 200 is represented by the following Equation (1):

$$\tau_m = I_m \frac{d\omega_m}{dt} + K(\theta_m - \theta_L) = I_m \frac{d\omega_m}{dt} + I_L \frac{d\omega_L}{dt} + \tau_d \quad \text{Equation (1)}$$

where ωm is a motor velocity, θm is a motor position, ωL is a load velocity, and τd is a load disturbance torque.

A conventional fully-closed loop position controller 300 in FIG. 5 is described below. A subtractor 50 subtracts a load position θL sensed by a load position sensor (not shown) from a position command value XC supplied from a higher-level device (not shown). A position deviation which is an output from the subtractor 50 is amplified by position loop gain KP times by a position deviation amplifier 51 to be used as a velocity command value. A subtractor 52 subtracts a mixed velocity feedback ωfb from the velocity command value. The velocity deviation which is an output from the subtractor 52 is amplified by velocity loop gain GV times by a velocity deviation amplifier 53 to be used as a control input τm to a drive motor.

The velocity loop gain GV can be obtained based on a proportional gain GP and an integral gain Gi from the following Equation (2):

$$GV = GP + Gi/s \quad \text{Equation (2)}$$

As the velocity loop gain GV does not specify a velocity control band, the natural resonance frequency ωv of the velocity control system with a rigid body approximation applied to the target plant 200 is assumed to be the velocity control band so as to associate the velocity control band ωv with the proportional gain GP and the integral gain Gi by the following Equation (3).

$$GP = 2(Im+IL)\omega v, \quad Gi = (Im+IL)\omega v 2 \quad \text{Equation (3)}$$

A differentiator 57 outputs a load velocity ωL by applying a temporal differentiation to the load position θL. A motor velocity ωm is sensed by a sensor (not shown) such as a position sensor and a velocity sensor disposed at the motor. A subtractor 56 subtracts the motor velocity ωm from the load velocity ωL. Then, the output of the subtractor 56 is amplified by mix gain fb times by an amplifier 55, and added with the motor velocity ωm by an adder 54 to be used as a mixed velocity feedback ωfb. This process is defined by the following Equation (4):

$$\omega fb = (1-fb)\omega m + fb\omega L \quad \text{Equation (4)}$$

where the mix gain fb represents a mix ratio of the motor velocity ωm and the load velocity ωL in the mixed velocity feedback ωfb. The mix gain fb is a parameter which is set in a range of 0≤fb<1.

Next, a stability limit of the position control system shown in FIG. 5 is described. Because the effect of the integral gain Gi to the stability issue is limited, the gain Gi is assumed to be zero (Gi=0). The following equation can be obtained by calculating the stability limit of the fully-closed loop position control based on the well-known Routh stability criterion:

$$K_p \omega_v < \left\{ \frac{R - (1+R)f_b}{2(1+R)(1-f_b)^2} \right\} \omega_z^2 \quad \text{Equation (5)}$$

where the ratio of load moment of inertia R=IL/Im, and the zero angular frequency of the target plant ωz=(K/IL)1/2.

Equation (5) indicates that the vibration characteristics become significant unless the servo gain (Kpωv) is reduced, because increase in the load moment of inertia IL decreases the zero angular frequency ωz, resulting in a smaller right side of the equation. However, it is known that the vibration suppression performance can be improved by setting the mix gain fb because the stability limit can be increased, in particular when the ratio of load moment of inertia R is high.

Thus, a stability limit increase ratio h(fb) is defined by using the mix gain fb in the following Equation (6):

$$h(f_b) = \frac{\frac{R - (1+R)f_b}{(1+R)(1-f_b)^2}}{\frac{R}{1+R}} \quad \text{Equation (6)}$$

FIG. 6 is a graph showing the stability limit increase ratio h(fb) against the mix gain fb with the ratio of load moment of inertia R used as a parameter. Equation (6) represents that the stability limit increase ratio h(fb) reaches the maximum with fb=(R−1)/(1+R). When the mix gain fb over this value is set, h(fb) rapidly decreases and easily enters into the range of h(fb)<1, as shown in FIG. 6.

In other words, for a control shaft having a significantly changing ratio of load moment of inertia R, it is required to select an optimum mix gain fb at the minimum R(Rmin) and set a sufficient servo gain (Kpωv) in consideration of the stability limit at the maximum R(Rmax).

Next, as an example, a target plant having the ratio of load moment of inertia R changing in the range of 3≤R≤10 is discussed. The servo gain (Kpωv) can be obtained from the following Equation (7), which applies a margin constant β (0.4<β<0.6) to Equation (5) in consideration of the stability limit and the vibration suppression characteristics:

$$K_p \omega_v = \beta \left\{ \frac{R - (1+R)f_b}{2(1+R)(1-f_b)^2} \right\} \omega_z^2 = \beta \left\{ \frac{R - (1+R)f_b}{2(1+R)(1-f_b)^2} \right\} \frac{K}{R \cdot I_m} \quad \text{Equation (7)}$$

Frequency characteristics of a command response θL/XC and a disturbance response ωL/τd supplied from the position control system shown in FIG. 5 are described by assuming that the target plant has characteristics of ωZ=64 rad/s=10 Hz in the case of R=10.

FIG. 7 shows frequency characteristics, in particular, when the servo gain (the position loop gain Kp and the velocity control band ωv) is appropriately set based on Equation (7) in the case of mix gain fb=0. In contrast, FIG. 8 shows frequency characteristics when the servo gain (Kpωv) is appropriately set based on Equation (7) in the case of R=10 with the mix gain fb=0.5, which achieves the maximum stability limit increase rate h(fb) in the case of R=3.

In this example, the mix gain fb=0.5, which is an optimum mix gain in the case of R=3 with the ratio of load moment of inertia R in the range of 3≤R≤10. Therefore, based on FIG. 6, the stability limit increase rate h(fb) is about 1.8 in the case of R=10. Accordingly, the command following performance is improved with the cutoff frequency of the command response θL/Xc increased from 10 Hz to 15 Hz. In addition, the load disturbance suppression performance in a middle or low frequency range is also improved about −7 dB. However, because the maximum value of the stability limit increase rate h(fb) is about 3 in the case of R=10, the control performance is not improved to nearly a limit.

As a conventional art, JP 2013-148422 A can be raised as an example.

As described above, in a conventional fully-closed loop position controller in which the velocity control system is configured based on a mixed velocity feedback ωfb of the motor velocity ωm and the load velocity ωL, the control performance cannot be sufficiently improved by the mix velocity feedback, in particular for a control shaft with a significantly changing ratio of load moment of inertia R.

SUMMARY

The present disclosure discloses a fully-closed loop position controller with a servo gain (KPωV) which is set so as to constantly achieve an optimum control performance by varying the mix gain fb in accordance with a changing ratio of load moment of inertia R to maintain the maximum stability limit increase rate h(fb).

The present disclosure discloses a fully-closed loop position controller of a numerically-controlled machine which controls a load position of a target plant by driving the target plant by a servo motor in accordance with a position command value supplied from a higher-level device. A velocity feedback control system of the fully-closed loop position controller is formed based on mix velocities of a motor velocity and a load velocity. The fully-closed loop position controller includes an identification calculator that identifies a ratio of load moment of inertia based on a control input, a motor velocity, and a load velocity of the servo motor; a mix gain calculator that calculates, based on the identified ratio of load moment of inertia, a mix gain which is a mix ratio of the mixed velocities; and a servo gain identifier that calculates a position loop gain and a velocity loop gain based on the identified ratio of load moment of inertia and the mix gain. The fully-closed loop position controller controls the load position based on the mix gain, the position loop gain, and the velocity loop gain.

In an embodiment according to the present disclosure, the fully-closed loop position controller further includes an integrating amplifier which calculates a ratio of load moment of inertia to be applied in the control based on the identified ratio of load moment of inertia; and a servo gain variable rate calculator that calculates a servo gain variable rate based on the ratio of load moment of inertia to be applied in the control and the mix gain. The servo gain identifier calculates the position loop gain and the velocity loop gain based on the ratio of load moment of inertia to be applied in the control and the servo gain variable rate.

More specifically, in the present disclosure, the fully-closed loop position controller includes initial parameters (R0, Fb0, ωV0, KP0) set in advance. The fully-closed controller constantly calculates a servo gain variable rate A with respect to the initial parameter (ωV0KP0) based on the ratio of load moment of inertia R which is identified in real time and the corresponding mix gain fb such that the proportional gain GP and the integral gain Gi, the combination of which forms the velocity loop gain GV, and the position loop gain KP to be applied to the control are appropriately varied.

In the fully-closed loop position controller according to the present disclosure, an optimum control performance can be constantly provided by varying the mix gain fb in accordance with the changing ratio of load moment of inertia R. More specifically, in the present disclosure, the proportional gain GP and the integral gain Gi, the combination of which forms the velocity loop gain GV, and the mix gain fb and the position loop gain KP can be appropriately varied in accordance with the changing ratio of load moment of inertia R. Therefore, the fully-closed loop position control system can constantly have an appropriate command following performance and load disturbance suppression performance even for a control shaft with the significantly changing ratio of load moment of inertia R.

BRIEF DESCRIPTION OF DRAWINGS

Embodiment(s) of the present disclosure will be described based on the following figures, wherein.

DESCRIPTION OF EMBODIMENTS

Figure 1:
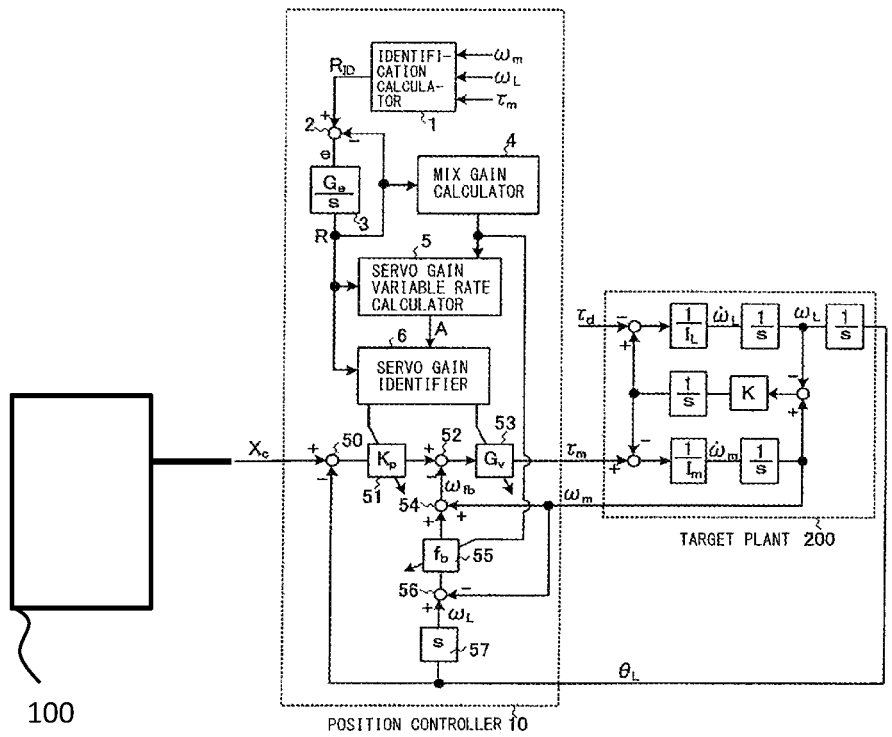
FIG. 1 is a block diagram showing an example of a fully-closed loop position controller according to the present disclosure.

Embodiments according to the present disclosure are described below. It should be noted that the following embodiments are provided merely as examples. The present disclosure is not limited to the following embodiments. FIG. 1 is a block diagram showing an example of a fully-closed loop position controller according to the present disclosure, in which a position command $X_c$ is supplied from a higher-level device 100. The following descriptions indicate only differences from those described above in the conventional arts.

The equation of motion of a target plant 200 shown in Equation (1) can be represented by the following equation by using the ratio of load moment of inertia R.

$$\tau_m = I_m \frac{d\omega_m}{dt} + R \cdot I_m \frac{d\omega_L}{dt} + \tau_d \qquad \text{Equation (8)}$$

This equation can be transformed to the following Equation (9) as a parametric representation:

$$\underbrace{\tau_m - I_m \frac{d\omega_m}{dt}}_{\tau_L (1 \times 1)} = \underbrace{\left[ I_m \frac{d\omega_L}{dt} \ 1 \right]}_{\xi(1 \times 2)} \underbrace{\begin{bmatrix} R \\ \tau_d \end{bmatrix}}_{\gamma(2 \times 1)} \qquad \text{Equation (9)}$$

A motor acceleration velocity dωm/dt and a load acceleration velocity dωL/dt can be calculated by sensing motor velocities ωm and load velocities ωL at sampling times. Further, because the control input τm is a calculated value by the position controller and the motor moment of inertia Im is a known parameter, the load torque τL on the left side of the Equation (9) and the signal row vector ξ on the right side can be obtained. Thus, the unknown parameter, column vector γ, on the right side of Equation (9) can be identified because by collecting n number of the load torques τL and the signal row vectors ξ in time series while acceleration velocity changes and arranging them in the row direction, the signal row vectors ξ form a signal matrix Ξ (n×2) in which each column vector is linearly independent.

An identification calculator 1 performs identification calculation of the above described unknown parameter, column vector γ, by using a well-known identification algorithm with signals ωm, ωL, τm as inputs when a change in acceleration velocity is sensed. In FIG. 1, the identified ratio of load moment of inertia R is represented by RID. The identified ratio of load moment of inertia RID which is an output from the identification calculator 1 is updated at each identification calculation.

A subtractor 2 subtracts the ratio of load moment of inertia R to be used in the control (hereinafter referred to as "the ratio of load moment of inertia R to be applied in the control") from the identified ratio of load moment of inertia RID. The output e from the subtractor (input to an amplifier) is amplified by the integral gain Ge by an integrating amplifier 3 to be used as the ratio of load moment of inertia R to be applied in the control. This series of calculations can be represented by the following Equation (10).

$$R = (R_{ID} - R)\frac{Ge}{s} \qquad \text{Equation (10)}$$

Figure 2:
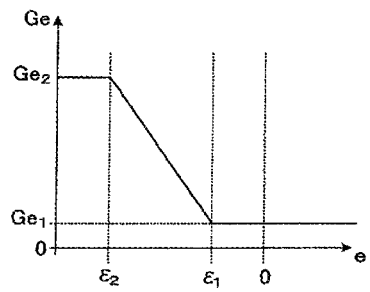
FIG. 2 is a graph showing a relationship between an amplifier input e and an integral gain Ge at an integrating amplifier 3 according to the present disclosure.

The integral gain Ge is transformed by the amplifier input e as shown in FIG. 2.

The values represented by ε1, ε2 (ε2<ε1<0) and Ge1, Ge2 (Ge1<Ge2) are predetermined constants which are preset in consideration of a possible variable range and the rate of change over time of the actual ratio of load moment of inertia R, and the filtering effect of the integrating amplifier 3. In this way, a position control operation within the stability limit range shown in FIG. 6 can be ensured by controlling the increase in the ratio of load moment of inertia R to be applied in the control such that, in the case of e>0 (RID>R), the increase in the ratio of load moment of inertia R is controlled to be moderate, whereas in the case of e<0 (RID<R), the integral gain Ge is increased more rapidly to enhance the following performance to RID and to decrease the R more rapidly with smaller RID (RID<<R).

Figure 6:
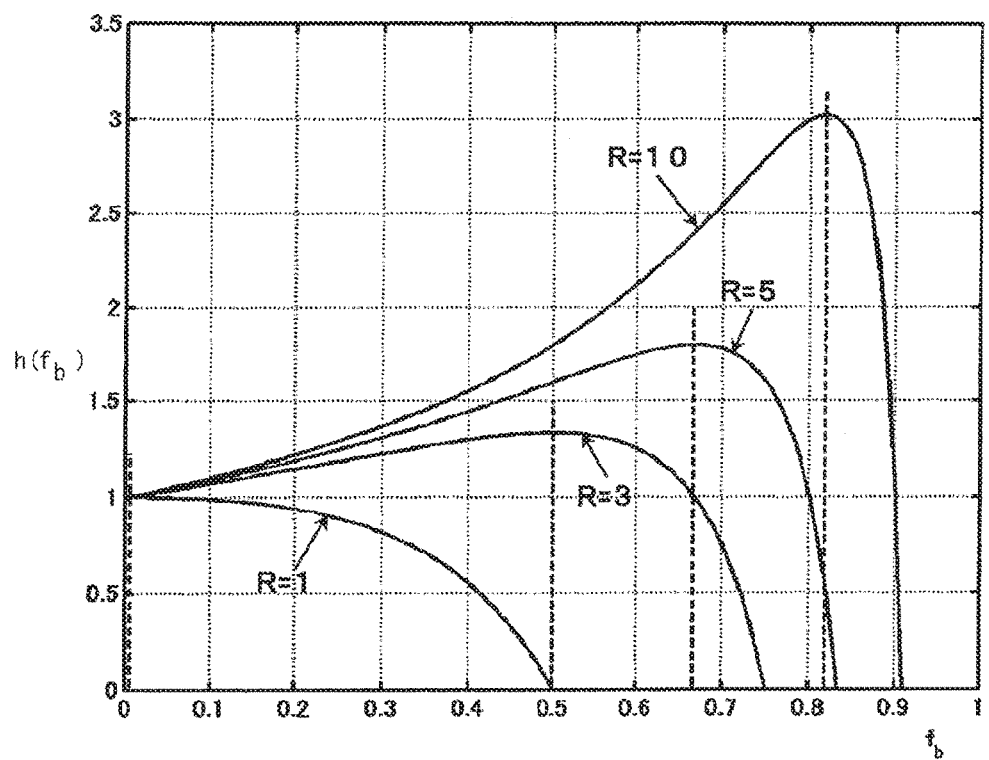
FIG. 6 is a graph showing a stability limit increased rate h(fb) against the mix gain fb with the ratio of load moment of inertia R used as a parameter.
Figure 7:
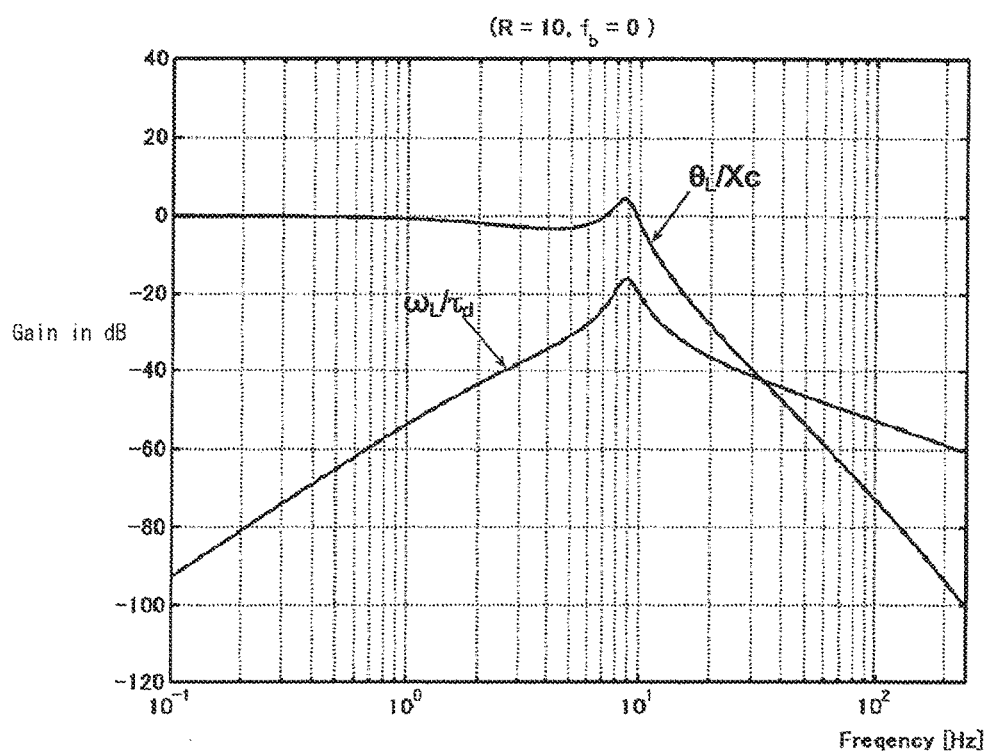
FIG. 7 is a graph showing an example of frequency characteristics of a position control system of a conventional fully-closed loop position controller.

A mix gain calculator 4 calculates the mix gain fb from the following Equation (11) based on the ratio of load moment of inertia R to be applied in the control:

$$\begin{cases} f_b = \frac{R-1}{1+R}\alpha & (R > 1) \\ f_b = 0 & (R \leq 1) \end{cases} \qquad \text{Equation (11)}$$

where α is a derating factor to apply a stability margin to the mix gain fb which achieves the maximum stability limit increase rate h(fb) shown in FIG. 6. The derating factor α is typically set within a range from 0.8 to 1. The calculated mix gain fb is set as an amplification factor of an amplifier 55.

In the present disclosure, the initial value R0 of the ratio of load moment of inertia is predetermined and fb0 corresponding to the initial value R0 is set in advance in a servo gain variable rate calculator 5. Further, when the target plant 200 to be controlled is determined, rigidity K can be obtained. Then, a velocity control band ωV0 and position loop gain KP0 are obtained for R0 and fb0 from Equation (7), and set in a servo gain identifier 6. Based on Equation (3), the proportional gain GP0 and the integral gain Gi0 forming the velocity loop gain GV0 are determined for the velocity control band ωV0 from the following Equation (12):

$$\begin{cases} G_{p0} = 2(1 + R_0)I_m\omega_{v0} \\ G_{i0} = (1 + R_0)I_m\omega_{v0}^2 \end{cases} \qquad \text{Equation (12)}$$

The servo gain variable rate calculator 5 calculates a servo gain variable rate A from Equation (13) below by using the initial values R0, fb0 and the ratio of load moment of inertia R to be applied in the control and the mix gain fb. The ratio of load moment of inertia R to be applied in the control and the mix gain fb are calculated in real time. The calculated value is output to the servo gain identifier 6.

$$A = \frac{K_p \omega_v}{K_{p0} \omega_{v0}} = \frac{\frac{1}{R}\left\{\frac{R-(1+R)f_b}{(1+R)(1-f_b)^2}\right\}}{\frac{1}{R_0}\left\{\frac{R_0-(1+R_0)f_{b0}}{(1+R_0)(1-f_{b0})^2}\right\}} \quad \text{Equation (13)}$$

The servo gain identifier 6 calculates the velocity control band ωv and the position loop gain Kp in real time from Equation (14) based on the predetermined initial values R0, ωV0, KP0, and the servo gain variable rate A (it should be noted that the velocity control band ωv is not essential in this example):

$$\begin{cases} \omega_v = \sqrt{A}\, \omega_{v0} \\ K_p = \sqrt{A}\, K_{p0} \end{cases} \quad \text{Equation (14)}$$

The proportional gain GP and the integral gain Gi forming the velocity loop gain GV are calculated from the following Equation (15) for the initial values GP0 and Gi0 based on the servo gain variable rate A and the ratio of load moment of inertia R to be applied in the control:

$$\begin{cases} G_p = \frac{(1+R)\omega_v}{(1+R_0)\omega_{v0}} G_{p0} = \frac{1+R}{1+R_0}\sqrt{A}\, G_{p0} \\ G_i = \frac{(1+R)\omega_v^2}{(1+R_0)\omega_{v0}^2} G_{i0} = \frac{1+R}{1+R_0}\sqrt{A}\, G_{i0} \end{cases} \quad \text{Equation (15)}$$

The calculated position loop gain Kp is set as an amplification factor of a positional deviation amplifier 51. The proportional gain GP and the integral gain Gi are set as amplification factors of a velocity deviation amplifier 53.

Figure 3:
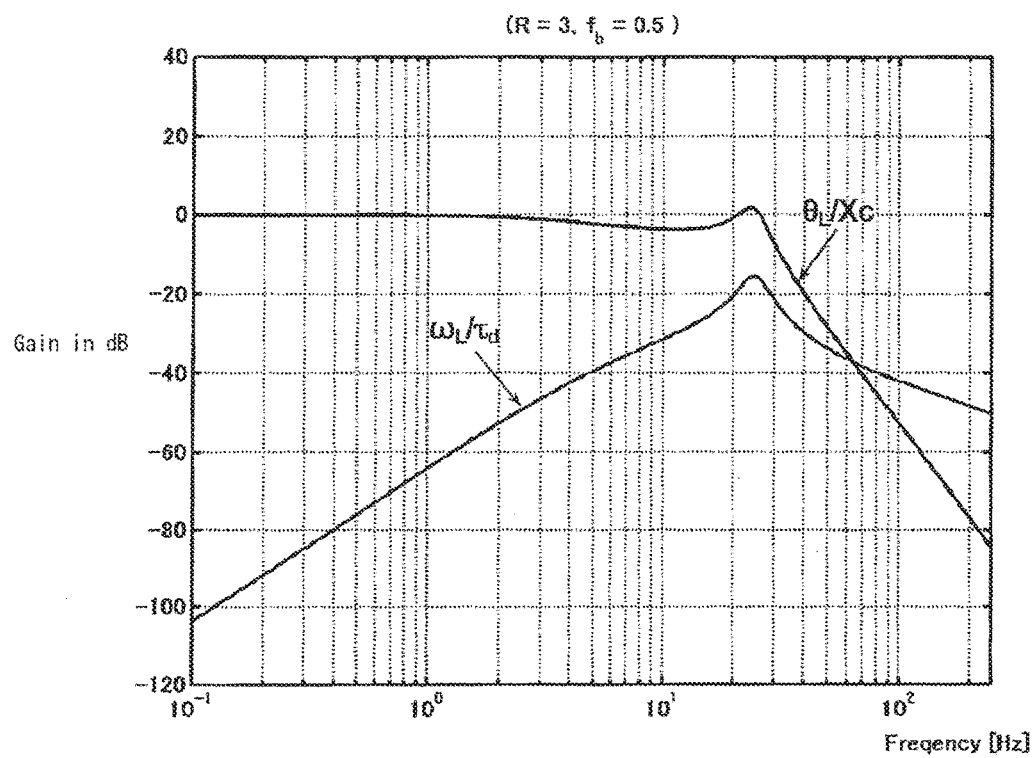
FIG. 3 is a graph showing an example of position control frequency characteristics by a fully-closed loop position controller according to the present disclosure.

FIG. 3 shows frequency characteristics of the command response θL/XC and the disturbance response ωL/τd when the position control system is configured by a servo gain (the position loop gain Kp and the velocity control band ωv) which is set from Equation (7) in a fully-closed loop position controller according to the present disclosure shown in FIG. 1, with the derating factor α=1 and the mix gain fb=0.5 in the case of the ratio of load moment of inertia R=3.

The position control characteristics of a fully-closed loop position controller according to the present disclosure are described in the case where the ratio of load moment of inertia R changes from R=3 to R=10. For the sake of convenience, conditions used in FIG. 3 are assumed to be the initial values (R0=3, fb0=0.5). The identification calculator 1 outputs an identified ratio of load moment of inertia RID=10. Then, the ratio of load moment of inertia R to be applied in the control converges from 3 to 10.

Figure 4:
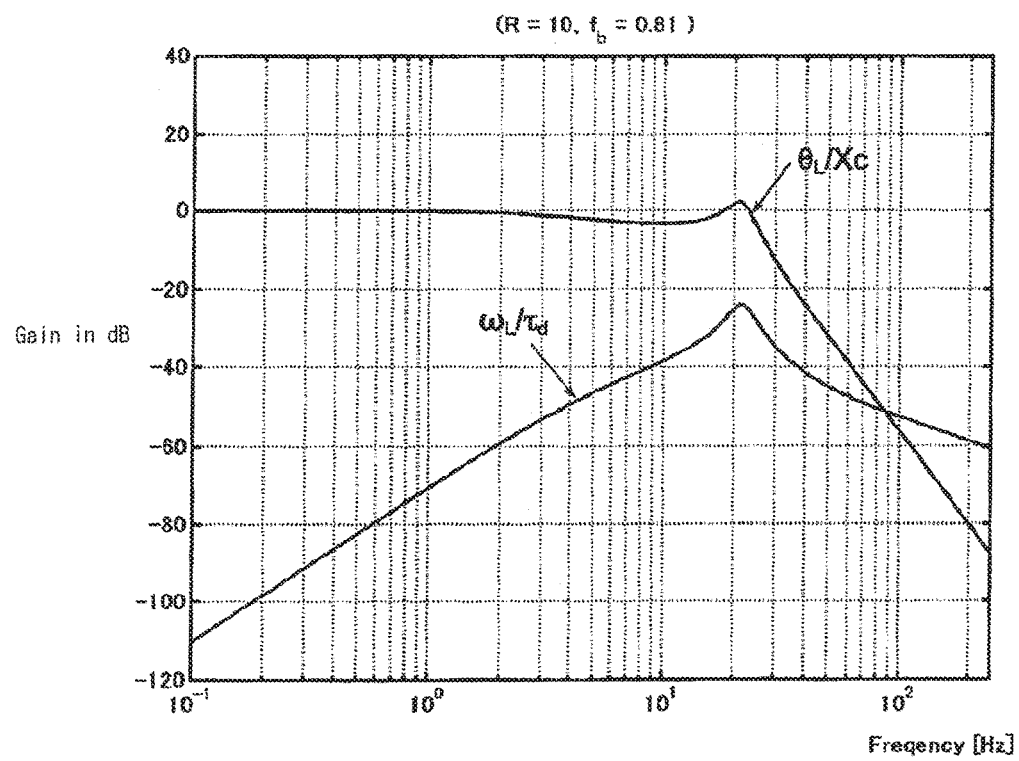
FIG. 4 is a graph showing another example of position control frequency characteristics by a fully-closed loop position controller according to the present disclosure.
Figure 5:
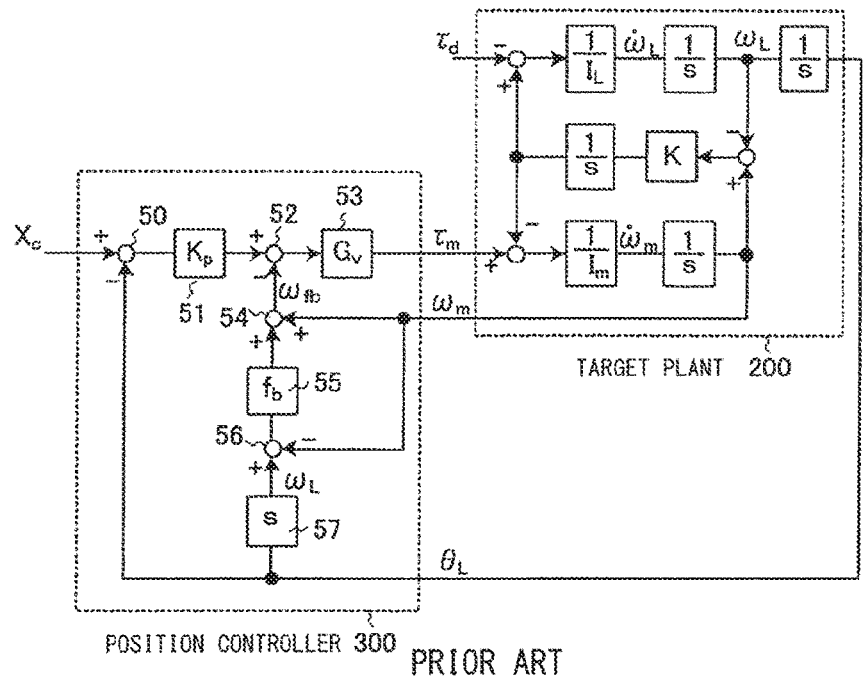
FIG. 5 is a block diagram showing an example configuration of a conventional fully-closed loop position controller.

The mix gain calculator 4 calculates and outputs the mix gain fb≈0.81 from Equation (11) (by assuming α=1). The servo gain variable rate calculator 5 calculates and outputs the servo gain variable rate A=0.82 from Equation (13). The servo gain identifier 6 determines the position loop gain Kp from Equation (14) and the proportional gain GP and the integral gain Gi from Equation (15). Because √A≈0.9, the position loop gain Kp and the velocity control band ωv are 0.9 times the initial values KP0 and ωV0. The proportional gain GP is about 2.5 times the initial value GP0 (11/4× 0.9≈2.5). The integral gain Gi is about 2.3 times the initial value Gi0 (11/4×0.82≈2.3). FIG. 4 shows the frequency characteristics of the command response θL/XC and the disturbance response ωL/τd under these conditions.

Figure 8:
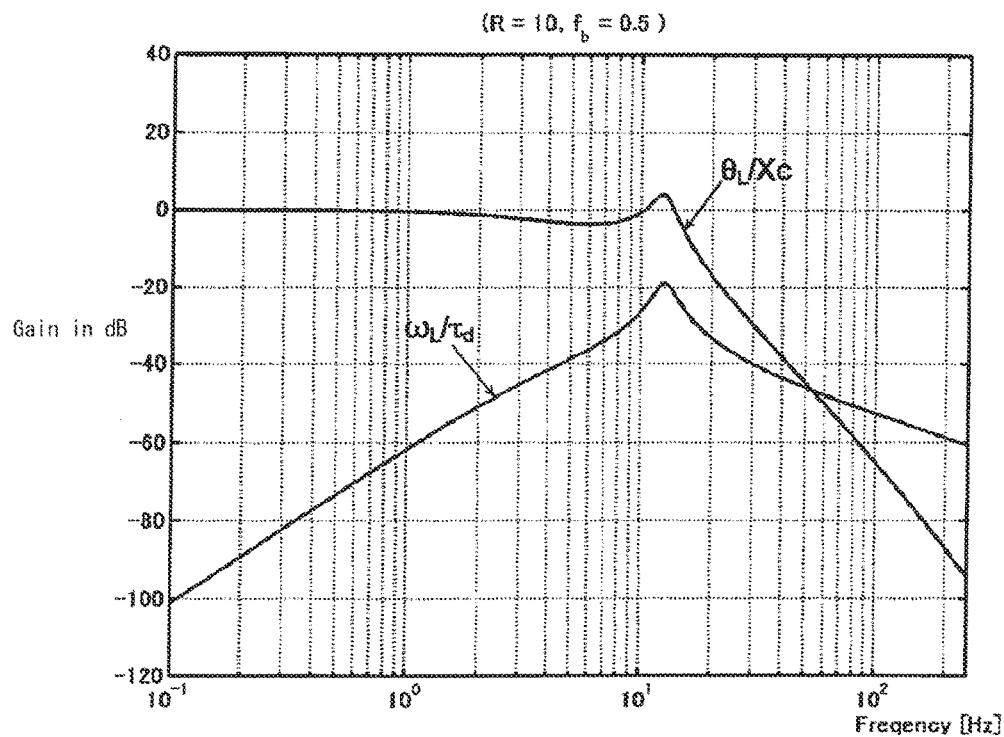
FIG. 8 is a graph showing another example of frequency characteristics of a position control system of a conventional fully-closed loop position controller.

In this way, the cutoff frequency of the command response θL/XC is broadened from 15 Hz to 24 Hz and the load disturbance suppression performance in the middle and low frequency band is improved about −10 dB in the case of the ratio of load moment of inertia R=10 in comparison to the control characteristics for conventional arts shown in FIG. 8.

As described above, a fully-closed loop position controller according to the present disclosure identifies the ratio of load moment of inertia R and selects an optimum mix gain fb in accordance with the changing R such that the proportional gain GP and the integral gain Gi of the velocity loop gain, and the position loop gain Kp can be appropriately varied. Therefore, a fully-closed loop position controller system constantly having a high level of command following performance and load disturbance suppression performance can be achieved even for a control shaft having a significantly variable ratio of load moment of inertia R.

The invention claimed is:

1. A fully-closed loop position controller of a numerically-controlled machine configured to control a load position of a target plant by driving the target plant in accordance with a position command value supplied from a higher-level device, wherein a velocity feedback control system is formed with mixed velocities of a motor velocity and a load velocity, the fully-closed loop position controller comprising:
   an identification calculator configured to identify a ratio of load moment of inertia based on a control input, the motor velocity, and the load velocity;
   an integrating amplifier configured to calculate a ratio of load moment of inertia to be applied to a servo gain variable rate calculator based on the identified ratio of load moment of inertia;
   a mix gain calculator configured to calculate a mix gain representing a mix ratio between mixed velocities based on the ratio of load moment of inertia; and
   a servo gain identifier configured to calculate a position loop gain and a velocity loop gain based on the ratio of load moment of inertia and the mix gain,
   wherein fully-closed loop position controller is configured to control the load position based on the mix gain, the position loop gain, and the velocity loop gain.

2. The fully-closed loop position controller according to claim 1, further comprising:
   the servo gain variable rate calculator configured to calculate a servo gain variable rate based on the ratio of load moment of inertia and the mix gain;
   wherein the servo gain identifier is configured to calculate the position loop gain and the velocity loop gain based on the ratio of load moment of inertia and the servo gain variable rate.

* * * * *